US010059589B2

(12) United States Patent
Thevasahayam

(10) Patent No.: US 10,059,589 B2
(45) Date of Patent: Aug. 28, 2018

(54) METHODS AND SYSTEMS FOR ISOLATING NITROGEN FROM A GASEOUS MIXTURE

(71) Applicant: EMPIRE TECHNOLOGY DEVELOPMENT LLC, Wilmington, DE (US)

(72) Inventor: Arockiadoss Thevasahayam, Tamilnadu (IN)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

(21) Appl. No.: 15/326,481

(22) PCT Filed: Jul. 14, 2015

(86) PCT No.: PCT/US2015/040285
§ 371 (c)(1),
(2) Date: Jan. 14, 2017

(87) PCT Pub. No.: WO2016/010969
PCT Pub. Date: Jan. 21, 2016

(65) Prior Publication Data
US 2017/0197831 A1    Jul. 13, 2017

(30) Foreign Application Priority Data
Jul. 14, 2014   (IN) .......................... 3474/CHE/2014

(51) Int. Cl.
*C01B 21/04*       (2006.01)
*B01D 53/75*       (2006.01)
(Continued)

(52) U.S. Cl.
CPC .......... *C01B 21/0411* (2013.01); *B01D 53/02* (2013.01); *B01D 53/75* (2013.01);
(Continued)

(58) Field of Classification Search
CPC . C01B 21/0411; C01B 21/04; C01B 21/0405; C01B 2210/0003;
(Continued)

(56) References Cited

U.S. PATENT DOCUMENTS 1,553,737 A    9/1925  Allingham
3,965,246 A    6/1976  Hinrichs
(Continued)

FOREIGN PATENT DOCUMENTS

DE    102008011005 A1    12/2008

OTHER PUBLICATIONS

Haber-Bosch process, in The Editors of Encyclopaedia Britannica, accessed at https://www.britannica.com/technology/Haber-Bosch-process, updated on Dec. 31, 1998.
(Continued)

*Primary Examiner* — Timothy C Vanoy

(57) ABSTRACT

Disclosed herein are methods and systems to isolate nitrogen from a mixture of gases. In an embodiment, a method of isolating nitrogen from a gaseous mixture involves contacting the gaseous mixture with a superparamagnetic catalyst to form a reaction mixture, and exposing the reaction mixture to a fluctuating magnetic field at ambient conditions.

20 Claims, 3 Drawing Sheets

(51) Int. Cl.
*B01D 53/81* (2006.01)
*B01D 53/86* (2006.01)
*B01D 53/02* (2006.01)
*B01J 23/83* (2006.01)
*B01J 35/00* (2006.01)
*B01J 37/04* (2006.01)
*B01J 37/06* (2006.01)
*B01J 37/08* (2006.01)
*B01J 19/08* (2006.01)

(52) U.S. Cl.
CPC ......... *B01D 53/81* (2013.01); *B01D 53/8621* (2013.01); *B01D 53/8671* (2013.01); *B01J 19/087* (2013.01); *B01J 23/83* (2013.01); *B01J 35/0033* (2013.01); *B01J 37/04* (2013.01); *B01J 37/06* (2013.01); *B01J 37/08* (2013.01); *B01D 2253/112* (2013.01); *B01D 2255/2065* (2013.01); *B01D 2255/20738* (2013.01); *B01D 2255/20746* (2013.01); *B01D 2255/20753* (2013.01); *B01D 2255/40* (2013.01); *B01D 2257/102* (2013.01); *B01D 2257/104* (2013.01); *B01D 2257/108* (2013.01); *B01D 2257/504* (2013.01); *B01J 2219/0854* (2013.01); *B01J 2219/0875* (2013.01); *B01J 2219/0892* (2013.01); *C01B 2210/0003* (2013.01); *C01B 2210/0045* (2013.01); *C01B 2210/0051* (2013.01); *C01B 2210/0053* (2013.01)

(58) Field of Classification Search
CPC .... C01B 2210/0053; C01B 2210/0045; C01B 2210/0051; B01D 53/8671; B01D 53/8621; B01D 53/75; B01D 53/02; B01D 53/81; B01D 2255/20738; B01D 2255/2065; B01D 2253/112; B01D 2257/108; B01D 2257/102; B01D 2257/104; B01D 2257/504; B01D 2255/20746; B01D 2255/20753; B01D 2255/40; B01J 23/83; B01J 35/0033; B01J 37/04; B01J 37/06; B01J 37/08; B01J 19/087; B01J 2219/0875; B01J 2219/0892; B01J 2219/0854
See application file for complete search history.

(56) References Cited

U.S. PATENT DOCUMENTS

| | | | |
|---|---|---|---|
| 4,668,379 A | 5/1987 | Rosensweig et al. | |
| 9,862,663 B2 * | 1/2018 | Thevasahayam | ..... C07C 29/147 |
| 2005/0287297 A1 | 12/2005 | Biris et al. | |
| 2009/0230347 A1 | 9/2009 | Pridöhl et al. | |
| 2011/0243828 A1 | 10/2011 | Gordon | |
| 2012/0308467 A1 | 12/2012 | Carpenter et al. | |
| 2013/0053471 A1 | 2/2013 | Studart et al. | |
| 2017/0210632 A1 * | 7/2017 | Thevasahayam | ......... C01C 1/04 |

OTHER PUBLICATIONS

International Search Report and Written Opinion for International Application No. PCT/US2015/040285 dated Dec. 15, 2015, pp. 10.

Lan et al., Synthesis of ammonia directly from air and water at ambient temperature and pressure, in Scientific Reports (Jan. 29, 2013), (3) Article No. 1145.

Niu et al., The corrosion of a Fe-15 wt.% Ce alloy in coal gasification type atmospheres at 600 to 800° C, in Journal of Phase Equilibria (Feb. 2002), 23(1) pp. 61-67.

* cited by examiner

METHODS AND SYSTEMS FOR ISOLATING NITROGEN FROM A GASEOUS MIXTURE

RELATED APPLICATION

This application is a U.S. national stage filing under 35 U.S.C § 371 of International Application No. PCT/US2015/040285 filed on Jul. 14, 2015 entitled "METHODS AND SYSTEMS FOR ISOLATING NITROGEN FROM A GASEOUS MIXTURE," which claims priority to Indian Patent Application No. 3474/CHE/2014, filed Jul. 14, 2014, entitled, "Methods and Systems for Isolating Nitrogen from a Gaseous Mixture," the contents of each of which are herein incorporated by reference in their entireties.

BACKGROUND

Nitrogen is frequently prepared by the fractional distillation of liquid air or by pressure swing adsorption (PSA) from atmospheric air. In the synthesis of nitrogen by PSA, the feed air is compressed and/or a vacuum pump is employed for reduction of bed pressure. Nitrogen recovery by PSA is rather low (40-50%) and the mechanical power required is very high. In the air fractionation process, likewise, the feed air needs to be compressed (to about 100 psi) and cooled prior to distillation. Therefore, it is relatively expensive to isolate nitrogen by this method.

SUMMARY

Disclosed herein are methods and systems to purify nitrogen from a mixture of gases. In an embodiment, a method of isolating nitrogen from a gaseous mixture involves contacting the gaseous mixture with a superparamagnetic catalyst to form a reaction mixture, and exposing the reaction mixture to a fluctuating magnetic field.

In an additional embodiment, a method of making a catalyst involves contacting a paramagnetic oxide, cerium (IV) oxide, and a base. In some embodiments, the catalyst may be $FeCe_2O_4$ nanoparticles.

In a further embodiment, a reactor system for isolating nitrogen from a gaseous mixture includes a closed reaction vessel configured to receive a gaseous mixture and a superparamagnetic catalyst, and at least one current carrying element arranged in proximity to a surface of the reaction vessel to provide a fluctuating magnetic field.

DETAILED DESCRIPTION

This disclosure is not limited to the particular systems, devices and methods described, as these may vary. The terminology used in the description is for the purpose of describing the particular versions or embodiments only, and is not intended to limit the scope.

Disclosed herein are methods and systems for isolating or purifying nitrogen from a mixture of gases. In some embodiments, a method of isolating nitrogen from a gaseous mixture involves contacting the gaseous mixture with a superparamagnetic catalyst to form a reaction mixture, and exposing the reaction mixture to a fluctuating magnetic field at ambient conditions. The gaseous mixture may be air, flue gas, natural gas, or any combination thereof. In some embodiments, the gaseous mixture includes nitrogen, hydrogen, oxygen, carbon dioxide, or any combination thereof. In other embodiments, the gaseous mixture may be compressed air.

Figure 1:
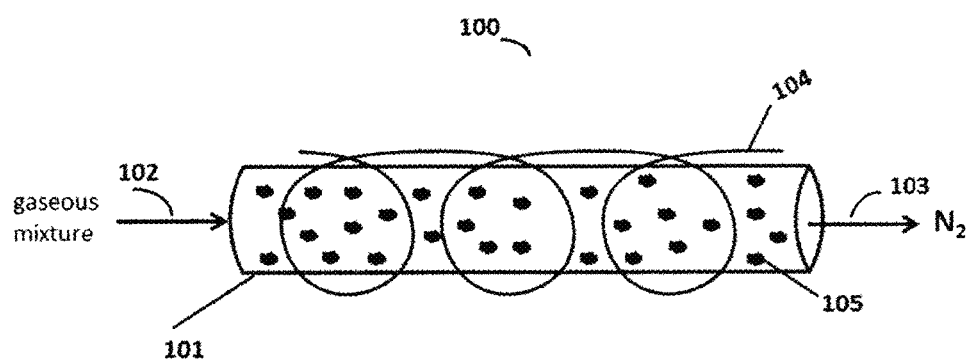
FIG. 1 depicts a diagram of a reactor system to purify nitrogen from a mixture of gases according to an embodiment.

FIG. 1 depicts an illustrative diagram of a reactor system 100 in accordance with an embodiment of the present disclosure. System 100 may be utilized for a one-step process for isolating nitrogen from air. The reactor system (or apparatus) 100 generally comprises a reaction vessel 101, an inlet valve for gaseous mixture 102, an outlet valve for nitrogen 103, and a current carrying element 104. Further, the catalyst $FeCe_2O_4$ 105 may be disposed within the reaction vessel.

In some embodiments, the reactor system 100 comprises at least one current carrying element 104 arranged in proximity to a surface of the reaction vessel and configured to provide a fluctuating magnetic field. Current carrying elements may be configured to generate magnetic fields of various strengths. The greater the current flow and coil density, the stronger the magnetic field. For instance, coil density may be high in order to produce a uniform magnetic field. In addition, the quantity of power required to achieve a particular magnetic field may depend on various factors, including the scale, structure, and location of the current carrying element with respect to the reaction vessel.

In other embodiments, the reactor system described herein may further comprise a thermoelectric couple, a pressure gauge, a temperature controller, a cooling system, a mechanical stirrer, or any combination thereof. In some embodiments, the current carrying element may be in close proximity to the reaction vessel. In other embodiments, the current carrying element may form a circular coil around a reaction vessel, as illustrated in FIG. 1. According to some embodiments, the strength of a magnetic field generated by the current carrying element may be about 0.1 millitesla to about 1 tesla, about 0.1 millitesla to about 0.5 tesla, about 0.1 millitesla to about 0.1 tesla, about 0.1 millitesla to about 10 millitesla, about 0.1 millitesla to about 1 millitesla, or any range between any two of these values (including endpoints). The current carrying elements may be energized using various methods, including, without limitation, direct current, alternating current, and high-frequency alternating current. According to embodiments, the high-frequency alternating current may be about 25 hertz (Hz) to about 1 megahertz, about 25 hertz to about 500 kilohertz, or about 25 hertz to about 100 kilohertz. Specific examples include, but are not limited to, about 25 hertz, about 100 hertz, about 500 hertz, about 1 kilohertz, about 300 kilohertz, about 400 kilohertz, about 500 kilohertz, and about 1 megahertz, or any range between any two of these values (including endpoints). In some embodiments, the electric current may be in the range of about 0.1 ampere (A) to about 100 A, about 0.1 ampere to about 50 A, about 0.1 ampere to about 30 A, or about 0.1 ampere to about 1 A. Specific examples include, but are not limited to, about 0.1 A, about 5 A, about 10 A, about 20 A, about 50 A, and about 100 A, or any range between any two of these values (including endpoints).

The reactor system described herein may be a batch reactor system or a continuous flow reactor system. In some embodiments, the reaction vessel may be configured to maintain a constant pressure of gaseous mixture during the reaction process. For example, the gaseous mixture may be present at a pressure of about 0.5 atmosphere to about 1.5 atmospheres, about 0.5 atmosphere to about 1 atmosphere, or about 0.5 atmosphere to about 0.75 atmosphere. Specific examples include about 0.5 atmosphere, about 0.75 atmosphere, about 1 atmosphere, about 1.25 atmospheres, and about 1.5 atmospheres, or any range between any two of these values (including endpoints).

The catalyst 105 that may be used in the reaction system 100 may be a superparamagnetic catalyst, such as $FeCe_2O_4$, $NiCe_2O_4$, or $CoCe_2O_4$, or any combination thereof. In some embodiments, the catalyst may be in the form of nanoparticles. The catalyst described in the embodiments herein may be unsupported or may be supported over a surface of a support in a manner that maximizes the surface area of the catalytic reaction. A suitable support may be selected from any conventional support, such as polymer membrane or a porous aerogel. For example, the catalyst may be coated on a polymer membrane and woven into a 3D mesh and introduced in the reactor system 100.

In some embodiments, the catalyst described herein may be present in the reaction mixture at about 0.1 mole percent to about 1 mole percent, about 0.1 mole percent to about 0.5 mole percent, or about 0.1 mole percent to about 0.2 mole percent of the total reaction mixture. Specific examples include, but are not limited to, about 0.1 mole percent, about 0.2 mole percent, about 0.3 mole percent, about 0.4 mole percent, about 0.5 mole percent, about 0.6 mole percent, about 0.7 mole percent, about 0.8 mole percent, about 0.9 mole percent and about 1 mole percent, or any range between any two of these values (including endpoints).

In some embodiments, the reaction mixture is exposed to a fluctuating magnetic field for about 30 minutes to about 3 hours. In some embodiments, the reaction mixture is exposed to a fluctuating magnetic field for about 30 minutes to about 2 hours. In some embodiments, the fluctuating magnetic field is applied for about 30 minutes to about 1 hour. In some embodiments, the reaction mixture is exposed to the fluctuating magnetic field for about 30 minutes, about 45 minutes, about 1 hour, about 1.5 hours, or about 3 hours, or any value or range of values between any of these values (including endpoints).

It is believed that the catalyst nanoparticles in the reaction mixture adsorb other gases in the mixture, leaving behind nitrogen, which exits the reaction vessel via an outlet. The obtained nitrogen gas is about 90% pure, about 95% pure, about 96% pure, about 97% pure, about 98% pure, about 99% pure, about 99.1% pure, about 99.5% pure, about 99.99% pure, or 100% pure. At the end of the reaction process, the superparamagnetic catalyst may be recovered by applying a magnetic field. For example, a bar magnet may be used to collect $FeCe_2O_4$ particles at the end of the reaction. The catalyst thus obtained can be reused.

Also disclosed herein are methods to make a catalyst. In some embodiments, the method involves contacting a paramagnetic oxide, cerium (IV) oxide, and a base. Non-limiting examples of paramagnetic oxides that my used include, but are not limited to, iron oxide, nickel oxide, and cobalt oxide, or any combination thereof. In some embodiments, the base may be aqueous ammonia or hydrazine hydroxide, or a combination thereof.

In some embodiments, the catalyst $FeCe_2O_4$ may be prepared by contacting $Fe_2O_3$, $CeO_2$, and aqueous ammonia. Aqueous ammonia (ammonium hydroxide) may have a concentration of about 20 weight percent to about 50 weight percent, about 20 weight percent to about 40 weight percent, or about 20 weight percent to about 30 weight percent. Specific examples include, but are not limited to, about 20 weight percent, about 25 weight percent, about 30 weight percent, and about 50 weight percent, or any range between any two of these values (including their endpoints). In some embodiments, contacting may be accomplished by any suitable means, including mixing, stirring, combining, shaking, agitation, and the like. $Fe_2O_3$, $CeO_2$, and aqueous ammonia may be contacted for about 10 minutes to about 1 hour, about 10 minutes to about 45 minutes, about 10 minutes to about 30 minutes, or about 10 minutes to about 20 minutes. Specific examples include, but are not limited to, about 10 minutes, about 20 minutes, about 30 minutes, about 45 minutes, and about 1 hour, or any range between any two of these values (including their endpoints). In some embodiments, $Fe_2O_3$ and $CeO_2$ may be contacted in a molar ratio of about 1:6 to about 1:2, about 1:6 to about 1:3, about 1:6 to about 1:4, or about 1:6 to about 1:5. Specific examples include, but are not limited to, about 1:6, about 1:5, about 1:4, about 1:3, and about 1:2, or any range between any two of these values (including their endpoints). In some embodiments, $CeO_2$, $Fe_2O_3$, and ammonia may be contacted in a molar ratio of about 4:1:5, about 4:1:6, about 4:2:5, about 2:1:3, or about 1:1:1.

After the mixing step, the solvent is evaporated. This step may be performed by any known process in the art, such as heating, rotary evaporation, air drying, Soxhlet extraction, refluxing, or evaporating in an oven until the solvent is substantially evaporated. For example, the solvent may be heated to about 80° C., about 100° C., about 120° C., or about 130° C., using a reflux condenser. The reaction process may be outlined as follows:

$$8CeO_2+2Fe_2O_3+10NH_3OH \rightarrow 4FeCe_2O_3+20H_2O+5N_2$$

In some embodiments, the $FeCe_2O_3$ obtained may further be subjected to the steps of washing, filtering, and drying. Drying may generally be performed in a hot air oven by heating to temperature of about 80-120° C. for 30-60 minutes. After drying, the $FeCe_2O_3$ powder may be heated in a furnace to a temperature of about 500° C. to about 800° C. The heating may be carried out, for about 5 minutes to about 1 hour, about 5 minutes to about 45 minutes, about 5 minutes to about 30 minutes, or about 5 minutes to about 15 minutes. Specific examples include, but are not limited to, about 5 minutes, about 10 minutes, about 15 minutes, about 30 minutes, about 45 minutes, and about 1 hour, or any ranges between any two of these values (including their endpoints).

In some embodiments, the $FeCe_2O_3$ obtained after heating is subjected to ethanol washing in the presence of oxygen. This step converts $FeCe_2O_3$ to $FeCe_2O_4$. This process may further impart a superparamagnetic property to the catalyst.

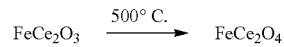

$$FeCe_2O_3 \xrightarrow{500° C.} FeCe_2O_4$$

Figure 2:
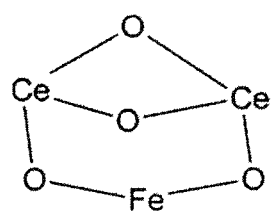
FIG. 2 represents a putative structure of $FeCe_2O_4$ according to an embodiment.

The $FeCe_2O_4$ catalyst obtained by the methods disclosed herein may be a nanoparticle having an average diameter of about 1 nanometer to about 50 nanometers, about 1 nanometer to about 40 nanometers, about 1 nanometer to about 25 nanometers, or about 1 nanometer to about 10 nanometers. Specific examples include, but are not limited to, about 1 nanometer, about 5 nanometers, about 15 nanometers, about 25 nanometers, and about 50 nanometers, or any range between any two of these values (including their endpoints). A putative structure of $FeCe_2O_4$ catalyst is shown in FIG. 2.

EXAMPLES

Example 1

Preparation of $FeCe_2O_4$ Catalyst

Figure 3:
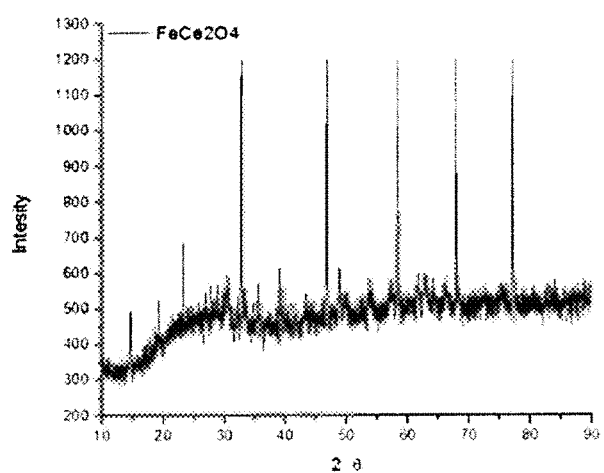
FIG. 3 depicts X-ray diffraction pattern of $FeCe_2O_4$ according to an embodiment. The XRD was acquired on a Xperts Pananalytical X-Ray diffractometer using Ni-filtered CuKα radiation (λ=0.15418 nm) with a scanning range (2θ) of 10 to 90. The peaks 2θ at 32.85, 46.724, 58.24, 67.70 and 77.19 correspond to iron cerium oxide (pcpdf files 36-1253).

About 1 gram of $Fe_2O_3$ and 5 grams of $CeO_2$ were mixed and about 50 mL of ammonia solution was added drop by drop to the mixture of oxides at room temperature for about 30 minutes to form a solution. The solution was transferred to a reflux condenser and maintained at 120° C. until all the solvent was evaporated. The $FeCe_2O_3$ powder obtained was washed with distilled water until a pH of 7 was reached. The $FeCe_2O_3$ powder was dried in an hot air oven at 100° C. for 30 minutes. After drying, the $FeCe_2O_3$ powder was heated in a furnace for 10-15 minutes at 700° C. The powdered material was removed and about 10 mL of ethanol was added immediately in the presence of atmospheric oxygen. Addition of ethanol to the hot powdered material instantly vaporized ethanol, thus imparting superparamagnetism to the catalyst. The $FeCe_2O_4$ catalyst prepared was characterized by X-ray diffraction and shows a polycrystalline structure (FIG. 3).

Example 2

Isolating Nitrogen Gas from Compressed Air

About 500 milligrams of $FeCe_2O_4$ catalyst prepared in Example 1 was introduced in a closed reaction vessel, connected to an air compressor and an outlet connected to a gas collection chamber. Air was introduced into the reaction vessel and was exposed to a fluctuating magnetic field by supplying an electric current of 230V, 50 Hz, 240 mA for 60 minutes (magnetic field about 1000 µtesla). During the reaction process, the outlet valve was opened to collect nitrogen that was released. The nitrogen gas that was obtained was 99% pure. The $FeCe_2O_4$ catalyst was recovered using simple magnets (0.03T) for reuse.

Example 3

Isolating Nitrogen from Flue Gas

About 500 milligrams of $FeCe_2O_4$ catalyst prepared in Example 1 is introduced in a closed reaction vessel, connected to a flue gas source and an outlet connected to a gas collection chamber. Flue gas is introduced into the reaction vessel and is exposed to a fluctuating magnetic field by supplying an electric current of 230V, 50 Hz, 240 mA for 75 minutes (magnetic field about 1000 µtesla). During the reaction process, the outlet valve is opened to collect nitrogen that is released. The nitrogen gas that is obtained is 98% pure. The $FeCe_2O_4$ catalyst is recovered using simple magnets (0.03T) for reuse.

Example 4

Measurement of Adsorption-Desorption Rates of Oxygen to $FeCe_2O_4$ Catalyst

About 100 milligrams of $FeCe_2O_4$ catalyst was placed in an enclosed chamber (250 mL vol) and exposed to various amounts of compressed air for 5 minutes. The initial pressure of compressed air was measured at the start of the experiment (A, Table 1). The chamber pressure after 5 minute exposure to 100 milligrams of $FeCe_2O_4$ was measured (B, Table 1), which indicated adsorption rate. To measure desorption, $FeCe_2O_4$ particles were kept in vacuum and subsequently exposed to hyperthermia for 5 minutes and the chamber pressure was measured (C, Table 1). The release of the adsorbed gas indicated the desorption rate.

TABLE 1

| A: chamber pressure (mbar) at the start of the experiment | B: chamber pressure (mbar) after 5 minute exposure | C: chamber pressure (mbar) after hyperthermia |
| --- | --- | --- |
| 10 | 3.13 | 6.36 |
| 20 | 12.84 | 6.97 |
| 30 | 22.64 | 6.97 |
| 40 | 32.64 | 6.97 |
| 50 | 42.64 | 6.97 |

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (example, bodies of the appended claims) are generally intended as "open" terms (example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (example, the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (example, "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (example, "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A method of isolating nitrogen from a gaseous mixture, the method comprising:
   contacting the gaseous mixture with a superparamagnetic catalyst to form a reaction mixture; and
   exposing the reaction mixture to a fluctuating magnetic field.

2. The method of claim 1, wherein contacting the gaseous mixture with a superparamagnetic catalyst comprises contacting the gaseous mixture with $FeCe_2O_4$.

3. The method of claim 1, wherein contacting the gaseous mixture with a super paramagnetic catalyst comprises contacting air, flue gas, natural gas, or any combination thereof with the superparamagnetic catalyst.

4. The method of claim 1, wherein contacting the gaseous mixture with a super paramagnetic catalyst comprises contacting nitrogen, hydrogen, oxygen, carbon dioxide, or any combination thereof with the superparamagnetic catalyst.

5. The method of claim 1, wherein contacting the gaseous mixture with the superparamagnetic catalyst comprises contacting the gaseous mixture and the superparamagnetic catalyst in a closed reaction vessel.

6. The method of claim 1, wherein exposing the reaction mixture to the fluctuating magnetic field comprises exposing the reaction mixture to the fluctuating magnetic field in a closed reaction vessel.

7. The method of claim 1, wherein exposing the reaction mixture to the fluctuating magnetic field comprises exposing the reaction mixture to the fluctuating magnetic field in a closed reaction vessel having at least one inlet and at least one outlet.

8. The method of claim 1, wherein exposing the reaction mixture to the fluctuating magnetic field further comprises maintaining a constant pressure in a reaction vessel during the exposing step.

9. The method of claim 8, wherein maintaining the constant pressure in the reaction vessel comprises maintaining a constant pressure of about 0.5 atmosphere to about 1.5 atmospheres in the reaction vessel.

10. The method of claim 1, wherein contacting the gaseous mixture with the superparamagnetic catalyst to form a reaction mixture comprises contacting the gaseous mixture with the superparamagnetic catalyst which is present at about 0.1 mole percent to about 1 mole percent of the reaction mixture.

11. The method of claim 1, wherein contacting the gaseous mixture with the superparamagnetic catalyst comprises contacting the gaseous mixture with nanoparticles of $FeCe_2O_4$.

12. The method of claim 1, wherein contacting the gaseous mixture with the superparamagnetic catalyst comprises contacting the gaseous mixture with $FeCe_2O_4$ nanoparticles coated on a polymer membrane.

13. The method of claim 1, wherein exposing the reaction mixture to the fluctuating magnetic field comprises exposing the reaction mixture to the fluctuating electromagnetic field generated by an electrical current of about 0.1 ampere (A) to about 100 A, and a frequency of about 25 hertz to about 1 megahertz.

14. The method of claim 13, wherein exposing the reaction mixture to the fluctuating magnetic field comprises exposing the reaction mixture to the fluctuating electromagnetic field of about 0.1 millitesla to about 1 tesla.

15. The method of claim 1, wherein exposing the reaction mixture to the fluctuating magnetic field comprises exposing the reaction mixture to the fluctuating magnetic field for about 30 minutes to about 3 hours.

16. The method of claim 1, further comprising performing the contacting and the exposing steps by a batch process or a continuous process.

17. A reactor system for isolating nitrogen from a gaseous mixture, the reactor comprising:
  a closed reaction vessel configured to receive a gaseous mixture and a super paramagnetic catalyst; and
  at least one current carrying element arranged in proximity to a surface of the reaction vessel to provide a fluctuating magnetic field.

18. The reactor system of claim 17, wherein the catalyst is $FeCe_2O_4$ nanoparticles.

19. The reactor system of claim 17, wherein the reactor system is a batch reactor system or a continuous reactor system.

20. The reactor system of claim 17, wherein the reaction vessel is configured to maintain a constant pressure during a reaction process.

* * * * *